(12) United States Patent
Graepel et al.

(10) Patent No.: US 8,417,650 B2
(45) Date of Patent: Apr. 9, 2013

(54) EVENT PREDICTION IN DYNAMIC ENVIRONMENTS

(75) Inventors: Thore Graepel, Cambridge (GB); Joaquin Quinonero Candela, Cambridge (GB); Thomas Ivan Borchert, Cambridge (GB); Ralf Herbrich, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 551 days.

(21) Appl. No.: 12/694,485

(22) Filed: Jan. 27, 2010

(65) Prior Publication Data

US 2011/0184778 A1 Jul. 28, 2011

(51) Int. Cl.
*G06F 15/18* (2006.01)

(52) U.S. Cl.
USPC .......................................................... 706/12

(58) Field of Classification Search ...................... 706/12
See application file for complete search history.

(56) References Cited

U.S. PATENT DOCUMENTS

| | | | |
|---|---|---|---|
| 6,907,566 B1 | 6/2005 | McElfresh et al. |
| 7,043,462 B2 | 5/2006 | Jin et al. |
| 7,050,868 B1 | 5/2006 | Graepel et al. |
| 7,158,959 B1 | 1/2007 | Chickering et al. |
| 7,223,234 B2 | 5/2007 | Stupp et al. |
| 7,424,409 B2 | 9/2008 | Ben-Gal et al. |
| 7,565,370 B2 | 7/2009 | Milenova et al. |
| 7,774,227 B2 | 8/2010 | Srivastava |
| 2002/0016699 A1 | 2/2002 | Hoggart et al. |
| 2002/0016736 A1 | 2/2002 | Cannon et al. |
| 2005/0049990 A1 | 3/2005 | Milenova et al. |
| 2005/0144067 A1 | 6/2005 | Farahat et al. |
| 2006/0206479 A1 | 9/2006 | Mason |
| 2006/0248035 A1 | 11/2006 | Gendler et al. |
| 2006/0287988 A1 | 12/2006 | Mason |
| 2006/0293950 A1 | 12/2006 | Meek et al. |
| 2006/0294084 A1 | 12/2006 | Patel et al. |
| 2007/0112840 A1 | 5/2007 | Carson et al. |

(Continued)

FOREIGN PATENT DOCUMENTS

EP 1197899 A1 4/2002

OTHER PUBLICATIONS

G. Cormode, V. Shkapenyuk, D. Srivastava, and B. Xu, "Forward Decay: A Practical Time Decay Model for Streaming Systems", Data Engineering, IEEE Int'l Conf. on, Mar. 29-Apr. 2, 2009.*

(Continued)

*Primary Examiner* — Kakali Chaki
*Assistant Examiner* — Vincent Gonzales
(74) *Attorney, Agent, or Firm* — Zete Law, P.L.L.C.; MacLane C. Key

(57) ABSTRACT

Event prediction in dynamic environments is described. In an embodiment a prediction engine may use the learnt information to predict events in order to control a system such as for internet advertising, email filtering, fraud detection or other applications. In an example one or more variables exists for pre-specified features describing or associated with events and each variable is considered to have an associated weight and time stamp. For example, belief about each weight is represented using a probability distribution and a dynamics process is used to modify the probability distribution in a manner dependent on the time stamp for that weight. For example, the uncertainty about the associated variable's influence on prediction of future events is increased. Examples of different schedules for applying the dynamics process are given.

20 Claims, 15 Drawing Sheets

U.S. PATENT DOCUMENTS

| | | | |
|---|---|---|---|
| 2007/0124194 | A1 | 5/2007 | Barnette, Jr. et al. |
| 2007/0219433 | A1 | 9/2007 | Stupp |
| 2007/0271075 | A1 | 11/2007 | Chen et al. |
| 2008/0033810 | A1 | 2/2008 | Chu |
| 2008/0195404 | A1* | 8/2008 | Chron et al. ............... 705/1 |
| 2008/0249832 | A1* | 10/2008 | Richardson et al. ......... 705/10 |
| 2009/0024332 | A1 | 1/2009 | Karlov et al. |
| 2010/0094768 | A1* | 4/2010 | Miltonberger ............ 705/325 |

OTHER PUBLICATIONS

Brynjolfsson, et al., "The Great Equalizer? An Empirical Study of Consumer Choice at a Shopbot", at <<http://www.chicagogsb.edu/research/workshops/marketing/archive/WorkshopPapers/montgomery.pdf>>, Erik Brynjolfsson, Michael D. Smith, and Alan L. Montgomery, 2004, pp. 26.

Chapelle, Zhang, "A Dynamic Bayesian Network Click Model for Web Search Ranking", retrieved on Oct. 30, 2009 at <<http://olivier.chapelle.cc/pub/DBN_www2009.pdf>>, ACM Proceedings of WWW Conference, Data mining/session: click models, Apr. 20, 2009, pp. 1-10.

Chickering, et al., "Targeted Internet Advertising Using Predictive Clustering and Linear Programming", available at least as early as Jul. 31, 2007, at <<http://research.microsoft.com/~meek/papers/goal-oriented.ps>>, pp. 7.

Dembczynski, Kotlowski, Weiss, "Predicting Ads' Click-Through Rate with Decision Rules", retrieved on Oct. 30, 2009 at <<http://research.yahoo.com/workshops/troa-2008/papers/submission_12.pdf>>, WWW Conference, Apr. 21, 2008, pp. 1-8.

Ghose, Yang, "An Empirical Analysis of Search Engine Advertising: Sponsored Search in Electronic Markets", retrieved on Oct. 30, 2009 at <<http://opimweb.wharton.upenn.edu/documents/seminars/paidsearch.pdf>>, INFORMS, Management Science, vol. 55, Issue 10, Oct. 2009, pp. 1605-1622.

Konig, Gamon, Wu, "Click-Through Prediction for News Queries", retrieved on Oct. 30, 2009 at <<http://research.microsoft.com/pubs/80233/sigir022-konig.pdf>>, ACM Proceedings of Conference on Research and Development in Information Retrieval (SIGIR), Jul. 19, 2009, pp. 347-354.

Regelson, et al., "Predicting Click-Through Rate Using Keyword Clusters", at <<http://www.business.ualberta.ca/kasdemir/ssa2/regelson_fain.pdf, ACM, 2006, pp. 6.

Girolami et al., "Variational Bayesian Multinomial Probit Regression with Gaussian Process Priors", Techincal Report: TR-2005-205, Nov. 9, 2005, University of Glasgow, pp#1-pp#35.

Herbrich et al., "TrueSkill: A Bayesian Skill Rating System", Technical Report MSR-TR-2006-80, Micorsoft Research, 2006, pp#1-pp#10.

Lawrence et al., "Learning to Learn with the Informative Vector Machine", Appearing in Proceedings of the 21st International Conference on Machine Learning, Banff, Canada, 2004, pp#1-pp#8.

Stern et al., "Bayesian Pattern Ranking for Move Prediction in the Game of Go", Appearing in Proceeding of the 23rd international Conference on Machine Learning, Pittsburgh, PA, 2006, pp#1-pp#8.

* cited by examiner

EVENT PREDICTION IN DYNAMIC ENVIRONMENTS

BACKGROUND

There are many situations in which it is desired to predict outcomes of events and in many cases it is required to make these predictions in real time and where huge amounts (such as terabytes) of information about past events are available to assist with the prediction.

For example, in the field of fraud detection it is often required to process large amounts of data about credit card transaction behavior and to use that information to make predictions as to whether ongoing or recent transactions are likely to be fraudulent. Other examples include email filtering where it is required to predict whether an email is likely to be spam or not on the basis of past examples of emails being labeled implicitly or explicitly as spam. This type of prediction is also required in the field of internet advertising where advertisers may often be billed an amount depending on a bid made by that advertiser for an advertisement and whether that advertisement, when displayed, is selected by one or more end users (by clicking on a link for example). Thus, internet advertisement channel providers typically need to predict so called "click-through rates", or the probability that a proposed advertisement will be clicked on by one or more end users.

Previously it has been difficult to make such predictions of event outcomes with acceptable levels of accuracy and to do so in real time, for example, before a credit card transaction is complete, before delivery of an email, or before presentation of a proposed internet advertisement. This is especially difficult where there are large amounts of data about past events to be processed.

Coping with dynamic environments is also difficult in the field of event prediction and especially so where large amounts of data are involved. For example a stream of data comprising displayed advertisement impressions and associated click/non click data is dynamic and changes over time. Streams of other types of data in other problem domains also exhibit this property. For example, data about credit card transaction behavior changes as user spending patterns change over time and also as fraudulent activity fluctuates and evolves. An event prediction system needs to be able to adapt as the data changes in real time.

It is noted that the invention described herein is not intended to be limited to implementations that solve any or all of the above mentioned disadvantages.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Event prediction in dynamic environments is described. In an embodiment a prediction engine may use the learnt information to predict events in order to control a system such as for internet advertising, email filtering, fraud detection or other applications. In an example one or more variables exists for pre-specified features describing or associated with events and each variable is considered to have an associated weight and time stamp. For example, belief about each weight is represented using a probability distribution and a dynamics process is used to modify the probability distribution in a manner dependent on the time stamp for that weight. For example, the uncertainty about the associated variable's influence on prediction of future events is increased. Examples of different schedules for applying the dynamics process are given.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an internet advertising system, an email filtering system, or a credit card transaction fraud detection system, the system described is provided as an example and not a limitation. As those skilled in the art will appreciate, the present examples are suitable for application in a variety of different types of systems which require event prediction. A non-exhaustive list of examples is: credit scoring system, search engine, binary classification system and information filtering system.

The term "indicator variable" is used herein to refer to a variable which may take only one of two values such as 0 and 1. Each indicator variable is associated with a feature which describes or is associated with an event. In contrast, a "variable" may take any real value. For example, suppose a feature 'price' is specified. A variable associated with this feature may take any real value such as a number of cents. An "indicator variable" with this feature may take a value of say 0 or 1, to indicate for a given event, into which of a specified set of price ranges the event falls.

In the embodiments described herein a stream of event data is typically accessed and it is required to predict future items in that stream of event data. For example, the events may be advertisement impressions and the event data may be, for each event, values taken by a specified set of features for that particular advertisement impression. In the case of an advertisement impression a non-exhaustive list of examples of features is: clientIP, match type and a generalized notion of position (page number, position on page, ad count).

In the examples described herein it is possible to use a particular type of data structure to represent the event data which comprises sparse binary vectors. This is now described with reference to FIG. 1 in the case where the event data are advertisement impressions. However, this type of data structure may be used for any other types of event data. Note that it is not essential to use sparse binary vectors. In other embodiments the variables may take any real values as mentioned above.

Figure 1:
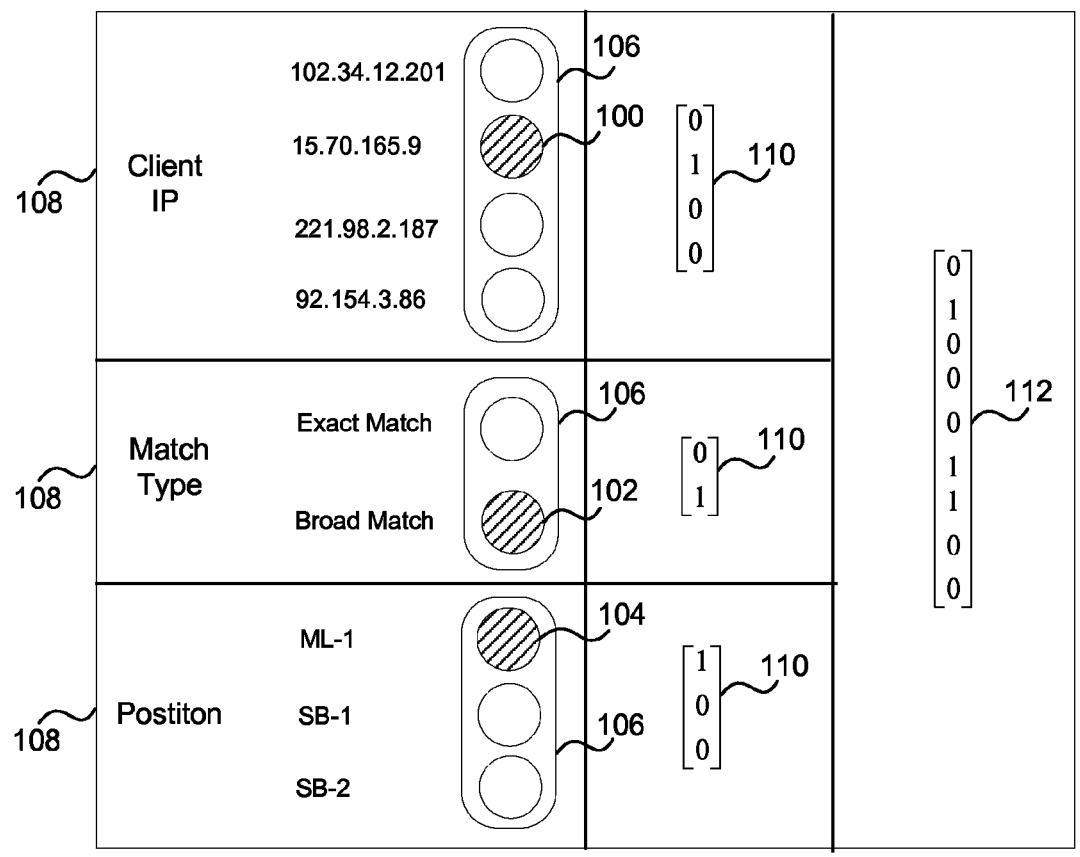
FIG. 1 is a schematic diagram of an advertisement impression represented as a sparse binary vector.

In the example illustrated in FIG. 1 an advertisement impression was delivered to client IP 15.70.165.9 (see 100 in FIG. 1), the match type was broad 102 and the advertisement was displayed in position ML-1 (see 104 in FIG. 1). There are a plurality of categories 106 for each feature 108 and each feature takes only one active category for a given impression. In this way a binary indicator feature vector 110 may be obtained for each feature. The binary indicator vectors may be stacked to obtain a representation of the advertisement impression as a sparse binary vector 112.

Although a feature such as ClientIP may be able to take millions of possible feature values, for any particular advertisement impression only one of these feature values is active. In this way an advertisement impression is fully represented by a set of active values, one per feature. If there are a total of N features (in the example of FIG. 1 N=3) then an advertisement impression is described by the corresponding N feature values. A sparse binary input vector x may be obtained by stacking the N individual feature vectors as follows:

$$x = \begin{bmatrix} x_1 \\ \vdots \\ x_N \end{bmatrix},$$

$$\text{where } x_i = \begin{bmatrix} x_{i,1} \\ \vdots \\ x_{i,M_i} \end{bmatrix}, \text{ and } \sum_i x_{i,j} = 1 \text{ for all } i = 1, \ldots, N$$

Each feature is represented by a binary indicator vector: $x_i$ for the i-th feature. Each position in feature vector $x_i$ corresponds to one of the possible $M_i$ values that feature can take. All values of the vector are 0 except for the one corresponding to the active value for the current impression which is set to 1. The total number of elements of the input vector x set to 1 is N.

The extreme sparsity of vector x gives computational benefits. When training the model, only the fields corresponding to the N active feature values need to be updated. At prediction time, only those N fields need to be accessed. Note that identical feature representations may be used at training time and at prediction time.

Figure 2:
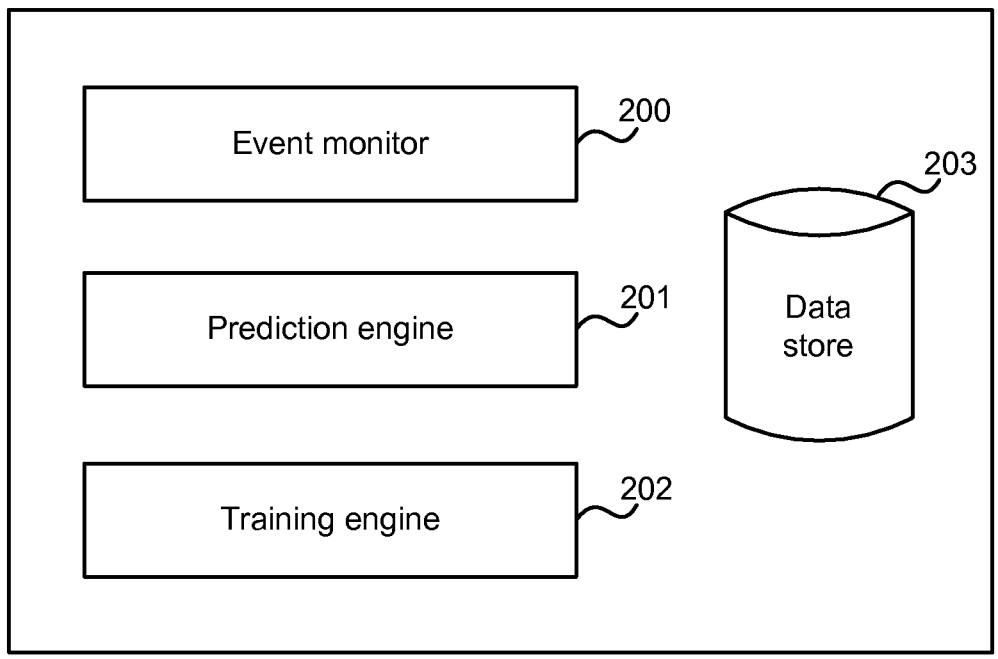
FIG. 2 is a schematic diagram of an event prediction system.

FIG. 2 is a schematic diagram of an event prediction system comprising an event monitor 200 which observes events which occur and their outcomes. The event monitor 200 comprises functionality to access information about the events such as features associated with those events as well as about outcomes of the events. This information may be stored in a data store 203 by the event monitor or other suitable means. A training engine 202 is able to access the historical data about events and event outcomes from the data store 203 and to use this to carry out a training process in order to learn information about weights or other parameters modeling the behavior or process producing the events. The learnt information may be stored in the data store 203. A prediction engine is able to access the learnt information and to use that to predict likelihoods of outcomes for proposed events.

Figure 3:
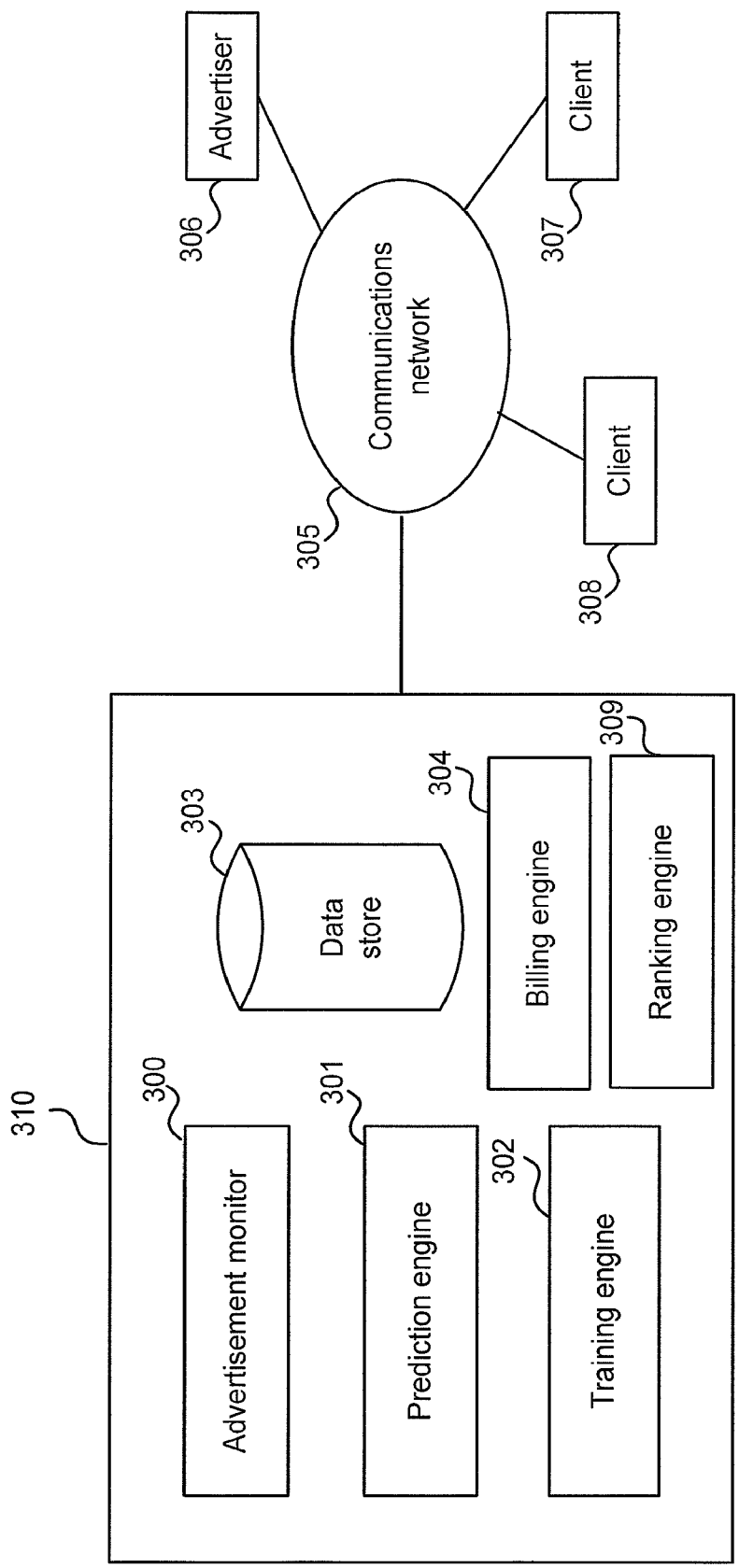
FIG. 3 is a schematic diagram of an internet advertising system.

For example, the event prediction system may in some embodiments be an internet advertisement system 310 as illustrated in FIG. 3. Here an advertisement monitor 300 observes advertisements that are displayed as well as whether those advertisements are clicked or not by one or more end users. The advertisement monitor may observe information about the event in which an advertisement is displayed and clicked or not. For example, the advertisement may be presented by a search engine as a result of a search query input by an end user. The monitor may observe features associated with the presentation of the advertisement such as any keywords used in the search query, a time of day of the presentation, information about the advertiser, information about the end user making the search query, or any other information about presentation of the advertisement. The observed information may be stored in a data store 303 and used by a training engine 302 in a similar manner to that described above with reference to FIG. 2. A prediction engine 301 uses the learnt information to predict how likely a proposed advertisement is to be clicked. That prediction information may be used in real time to optimize the delivery of advertisements. For example, advertisements may be ranked using ranking engine 309 by decreasing rank score where the rank scores are related to the bid made by the advertiser and the probability of click. The advertisement system 310 may then display the advertisements in the rank order subject to any additional filtering constraints or criteria. A billing engine 304 is then arranged to bill an advertiser 306 for example, according to the generalized second price auction or in any other suitable manner. One or more such advertisers 306 are in communication with the internet advertisement system via a communications network 305 as are one or more end users or clients 307, 308.

Figure 4:
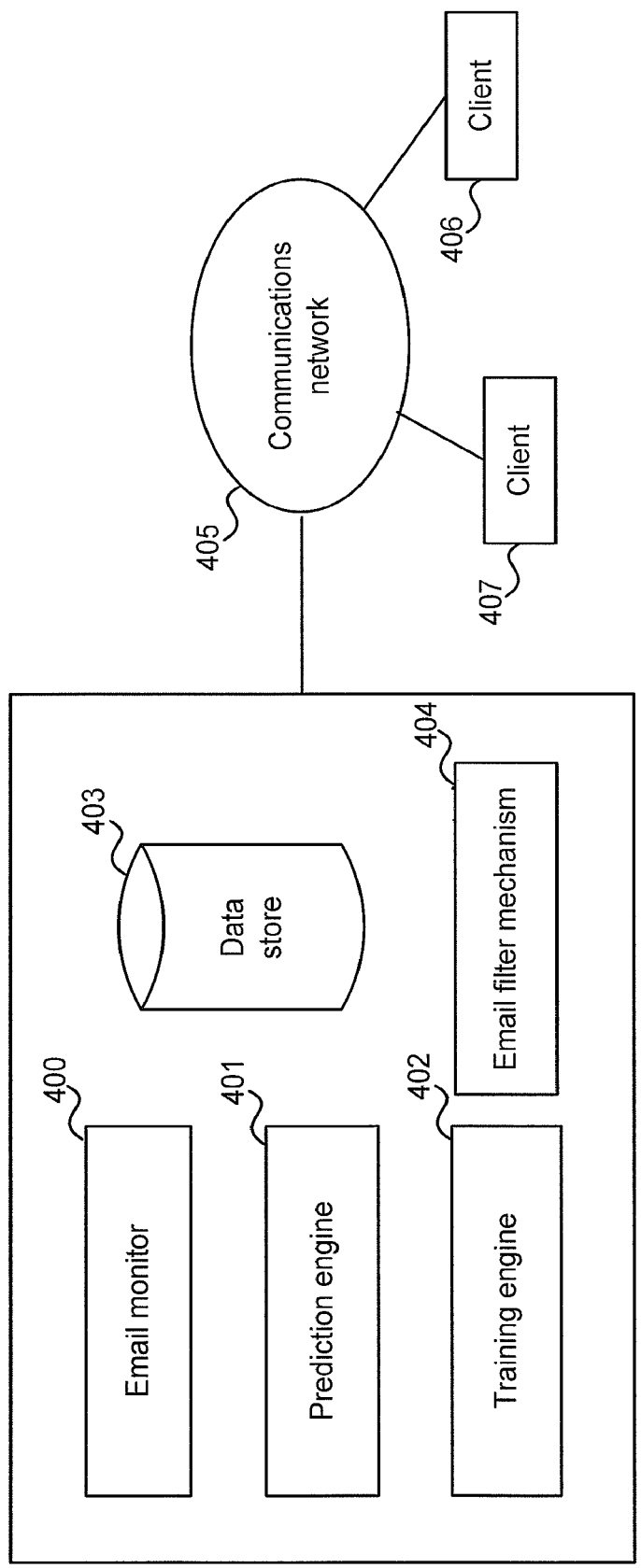
FIG. 4 is a schematic diagram of an email filtering system.

In another example, the event prediction system may be an anti-spam system for email. As illustrated in FIG. 4 an email monitor 400 observes information about or associated with email messages such as information about the sender, words used in the subject line, presence of attachments and other information. The email monitor 400 also observes information about whether those email messages are spam or not. This information may be stored in a data store 403 and used by a training engine 402 in a similar manner as described above with reference to FIG. 2. The results of the training engine may also be stored in the data store 403 and used by a prediction engine 401 to predict whether a given email message is spam or not. The prediction results may be used by an email filter mechanism in real time to block the email, alert users or allow the email as appropriate. The email monitor may receive information about email over a communications network 405 from any suitable source and where clients 406, 407 are observed to send and or receive email.

Figure 5:
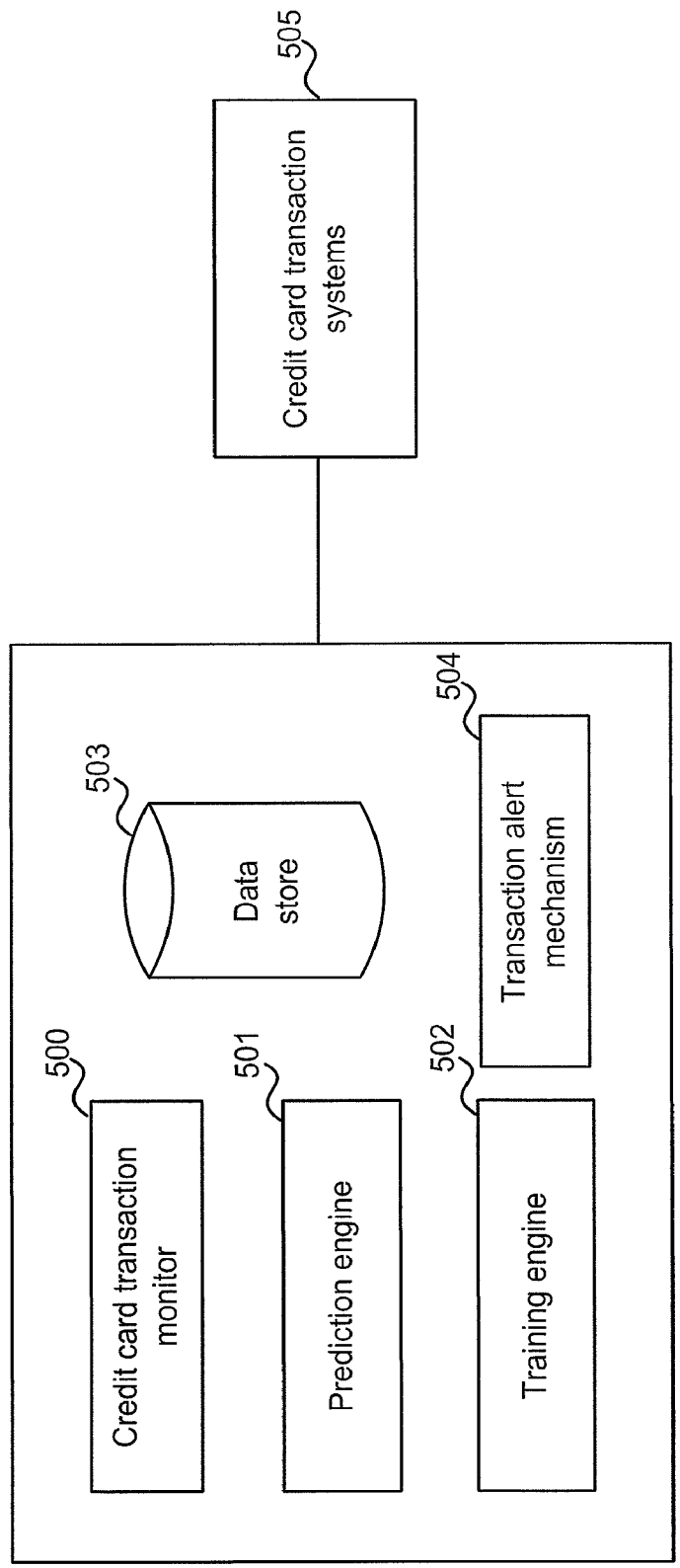
FIG. 5 is a schematic diagram of a credit card fraud detection system.

In another example, described with reference to FIG. 5 the prediction system is part of a credit card transaction fraud detection system. Credit card transaction systems 505 provide data to the prediction system so that a credit card transaction monitor 500 is able to observe credit card transactions and to obtain information about those transactions. For example, information about one or more parties to the transaction, information about the time of the transaction, information about the amounts and other information. The information may be stored in a data store 503 together with information about whether the transactions are fraudulent or not. A training engine 502 uses the information in the data store to learn statistics or parameters of a model of credit card transaction behavior in a similar manner as described above with reference to FIG. 2. The results are stored in the data store 503 and used by a prediction engine in real time 501 to predict whether a new credit card transaction is likely to be fraudulent. The prediction results are used by a transaction alert mechanism 504 which may provide output to the credit card transaction systems 505.

As mentioned above, coping with dynamic environments is difficult in the field of event prediction and especially so where large amounts of data are involved. In order to address this a dynamics process is implemented by the event prediction system. Different types of dynamics process may be used according to the needs of the particular application domain, resources available, real-time requirements and other factors. For example, two different dynamics processes are described in detail below. A first one of these is referred to as an additive noise dynamics process and is described below with reference to FIG. 8. A second one of these is referred to as a "revert to the prior" dynamics process and is described with reference to FIG. 9. There are also different schedules for applying the dynamics process within the event prediction system. For example, the dynamics process may be applied to individual weights at the same time as those weights undergo training updates. An example of this is described with reference to FIG. 6. Another option is to apply the dynamics process to batches of weights in a manner decoupled from training updates as described with reference to FIG. 7.

Figure 6:
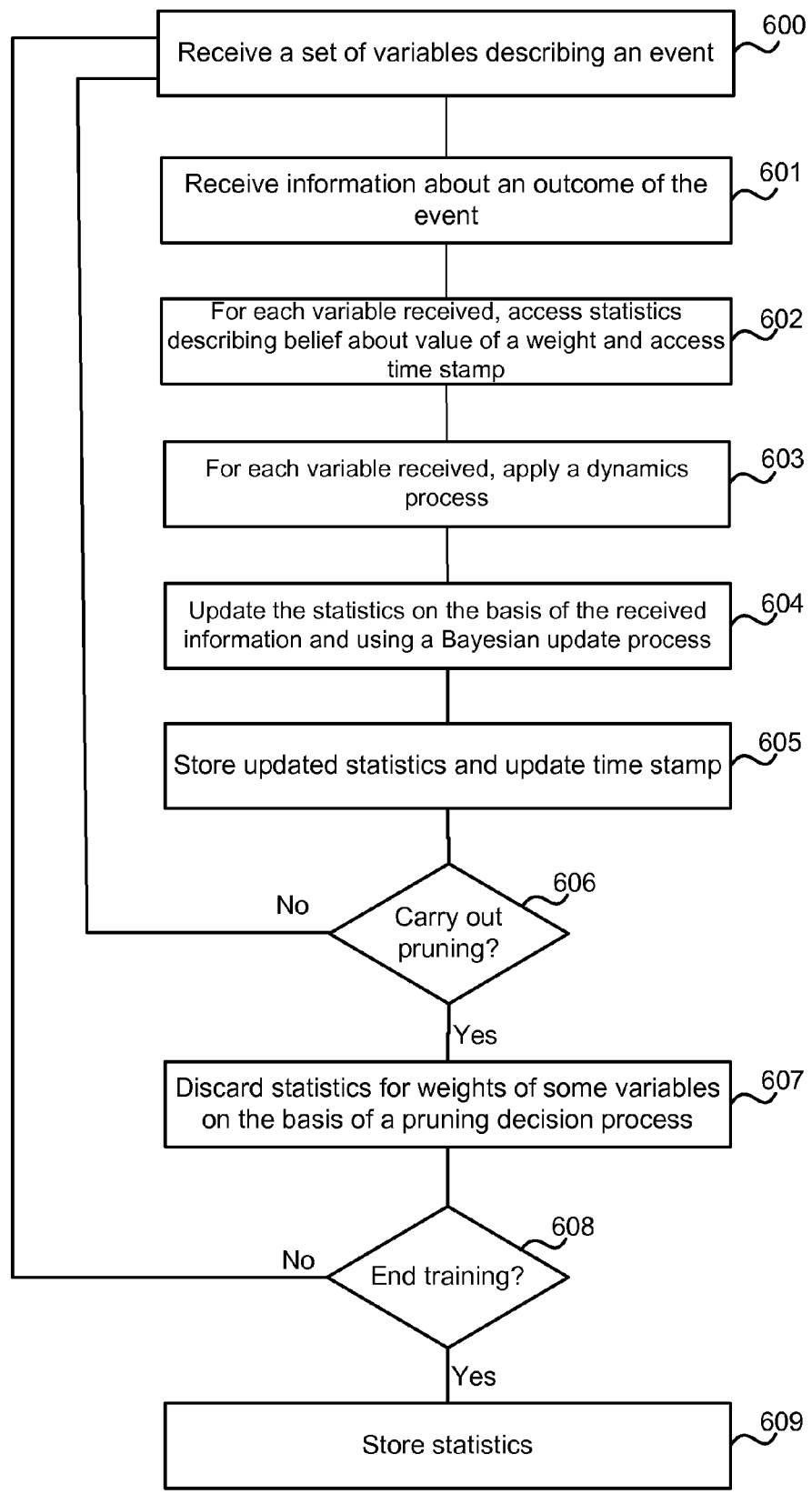
FIG. 6 is a block diagram of an example method of training an event prediction system.
Figure 7:
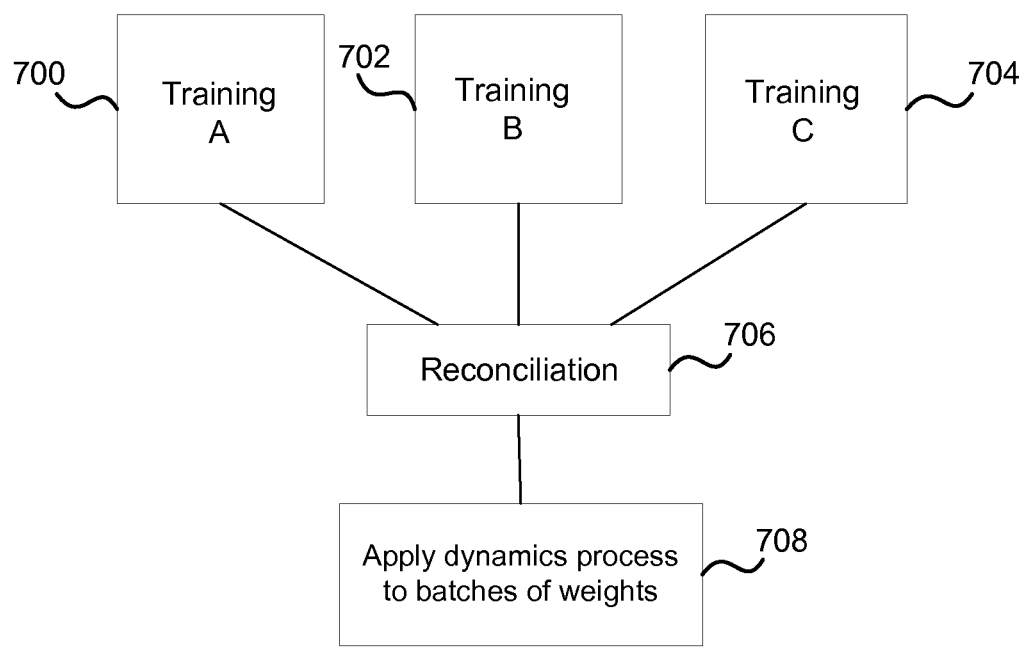
FIG. 7 is a flow diagram of a schedule for applying a dynamics process.

FIG. 6 is a block diagram of an example method of training carried out at a training engine such as any of the training engines of FIGS. 2 to 5 and where the training process incorporates a dynamics process.

A set of variables are received describing an event (block 600). For example, these variables are from historical data about past events and their outcomes. The variables received at the training engine may be received from a data store such as any of the data stores of FIGS. 2 to 5. For example, the set of variables may comprise a sparse binary vector as described above. Also received at the training engine is information about an outcome of the event (block 601).

A plurality of features describing or associated with events are pre-specified and for each of these features one or more variables can exist. For example, in the case of internet advertising, an example of a feature may be a time of day of a search query input by a user and resulting in display of an advertisement. Each variable is considered as having an associated weight and information about those weights is learnt during the training process. The weights are used to control how much influence each variable may have on the prediction to be made. Belief about each weight is modeled using any suitable distribution such as a Gaussian distribution and statistics are used to describe those distributions. For example, a mean and a variance are used to describe a Gaussian distribution representing belief about a given weight. However, it is not essential to use a Gaussian distribution; other types of distribution may be used. Also, other statistics may be used instead of or in addition to the mean and variance.

For each variable received for the given event, the training engine accesses statistics describing belief about a weight for the variable (block 602). For example, if the training process has not encountered the particular variables before, the statistics are given default, initial values. Otherwise, the statistics are accessed from the data store. Also, a time stamp value is accessed for each variable. This time stamp value relates to a time at which the variable was last updated by the training engine.

For each variable received, a dynamics process is applied 603. Any suitable dynamics process may be used such as either of those described with reference to FIGS. 8 and 9 below. The dynamics process enables the event prediction system to adapt appropriately to event data that is dynamic and changes over time.

The statistics are then updated on the basis of the received information and using a Bayesian update process (block 604). An example of a suitable Bayesian update process is described in more detail below. However, it is not essential to use that exact update process, any suitable Bayesian update process may be used.

The updated statistics are stored (block 605) for example in a data store such as any of those of FIGS. 2 to 5. The time stamps are also updated for each variable weight that was updated. A decision is then made by the training engine as to whether to carry out pruning (block 606). The pruning process involves discarding some of the statistics because it is typically not practical to store all these due to the huge amounts of data involved (for example, terabytes of information). The pruning process may be carried out at specified time intervals, or when memory availability is running low or when any combination of these or other conditions occur. If the decision is made not to carry out pruning, then training continues for another set of variables associated with another observed event. For example, in the field of internet advertising, hundreds of million advertisements may be shown in any 24 hour period.

If the pruning process occurs then statistics are discarded (block 607) for some of the weights on the basis of a pruning decision process which is described in more detail below. If the training process is to end (block 608) the remaining statistics are stored (block 609) otherwise the training process repeats for another set of variables describing another observed event. In some embodiments the time stamp values may be used during pruning by identifying weights which have a time stamp greater than a specified threshold. The statistics for these weights may then be set to default values.

In the example of FIG. 6 the schedule for applying the dynamics process is integral with the weight training updates. In this example, a dynamics process is applied to a weight when its distribution is being updated because a training example involving its associated value is being processed. This leverages the fact that a specific weight is being updated anyway. This type of schedule for applying the dynamics process is especially useful when the granularity of time stamps is high (such as 1 second or on the order of seconds). However, other possible schedules for applying the dynamics process may be used. For example, the dynamics process may be applied at every tenth training update or any other suitable interval of training updates. In another example, the dynamics process may be applied to batches of weights in a manner independent of, or decoupled from, the training updates. An example of this is now described with reference to FIG. 7.

A plurality of nodes 700, 702, 704 are provided which are processors of any suitable type such as machines in a data center, nodes in a communications network, processors in multi-core computers or combinations of these. Each node is arranged to implement part of an event prediction system so that a parallel implementation of the event prediction system is obtained. After training has been carried out using the parallel architecture, the nodes are arranged to communicate with one another to reconcile 706 the distributions over the weights. A dynamics process may then be applied 708 to all the weights or batches of the weights. In this way dynamics are applied to a single variable only once for a given time step.

The training process may be carried out offline, or during operation of the prediction process to predict event outcomes. A combination of offline training and online training may also be used.

It is also possible for the training process to be carried out using indicator variables as opposed to general variables taking real values. For example, there could be twenty four indicator variables for the time of day feature, one indicator variable for each hour of the day. In this case, only one indicator variable may be "on" for a given event because the event occurs at some point during only one hour of the day. When indicator variables are used, each indicator variable is considered as having an associated weight and information about those weights is learnt during the training process as described above with reference to FIG. 6.

As mentioned above a time stamp value may be accessed for each variable. For example, every feature value has a time stamp that records when that value was last updated. In order to save memory, this time stamp may be stored as a 16-bit integer. This is an example only and other representations may be used for the time stamp. In an example, the time stamp representation used is the number of hours passed since some base time (hardcoded as 12:00 am, Jan. 1, 1970), modulo a time horizon of three years (hardcoded value of 26,280 hours). This means that as long as the training engine deals with time differences of less than three years modulo arithmetic may be used. Given two times $t_0$ and $t_1$, where it is known that $t_1$ represents a time that is later than $t_0$ (which does not necessarily mean that $t_1 > t_0$), the difference between the times would be:

$$d(t_0, t_1) = (t_1 - t_0) \bmod 26{,}280$$

In the case of a default prior value for a feature, the time stamp will be empty. The difference between an empty time stamp and any other time stamp may be defined to always be zero.

Figure 8:
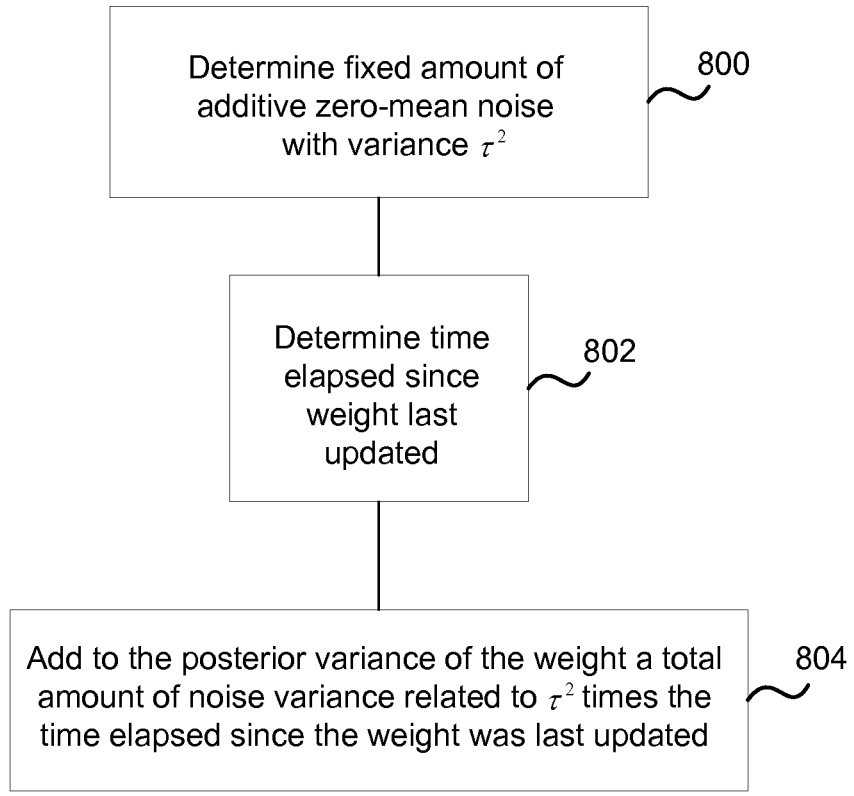
FIG. 8 is a flow diagram of an additive noise dynamics process.
Figure 9:
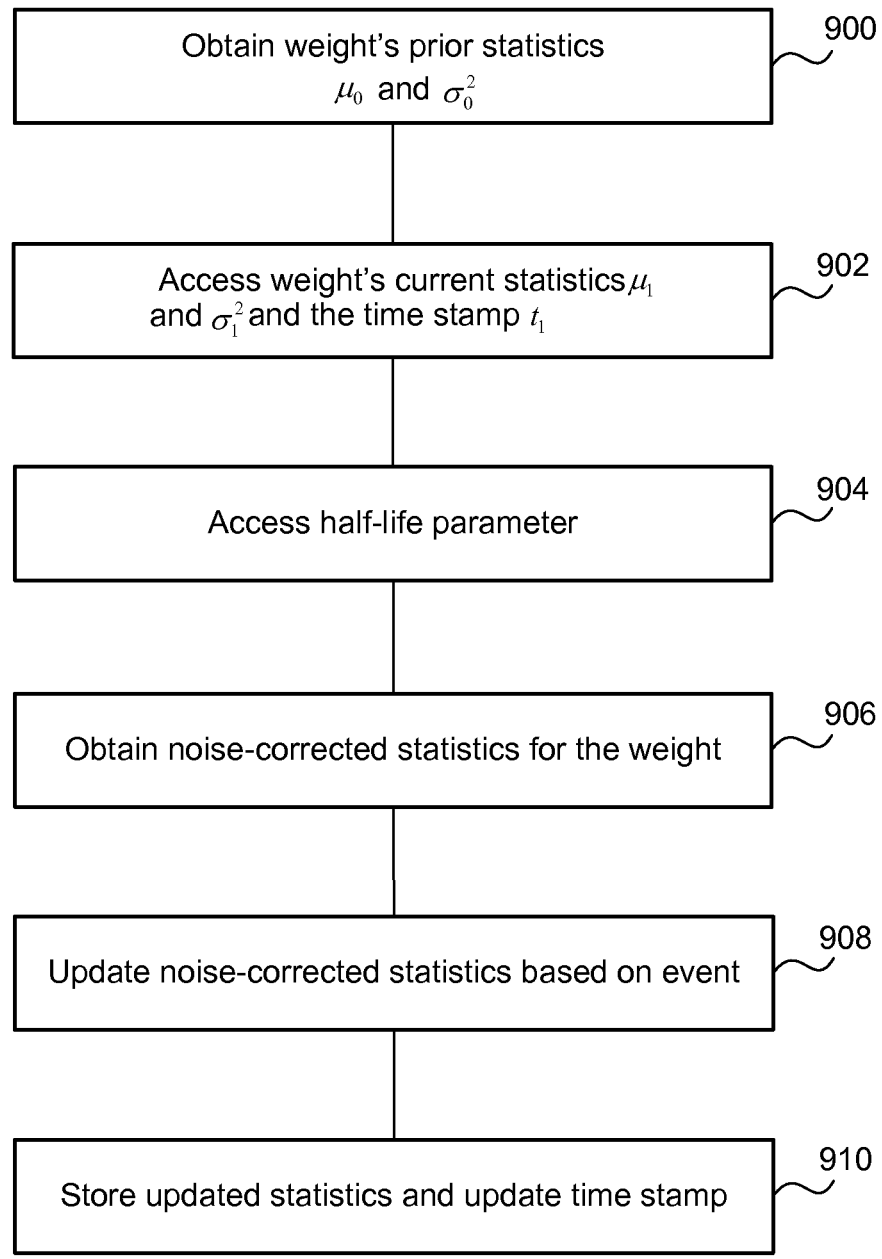
FIG. 9 is a flow diagram of a "revert to prior" dynamics process.

An additive noise dynamics process is now described with reference to FIG. 8. The event prediction system determines the fixed variance $\tau^2$ of an additive zero-mean noise process. The event prediction system also determines 802 the time elapsed since a weight (to which dynamics is to be applied) was last updated and adds 804 to the posterior variance of that weight a total amount of noise variance which is related to $\tau^2$ times the time elapsed since the weight was last updated. It is noted that only the variance (and not the mean) of the variance of the weight is affected by this type of dynamics process. As mentioned above, this additive noise dynamics process may be applied in the event prediction system using any suitable schedule.

An example additive noise update consists in replacing the current value of the weight variance $\sigma_{i,j}^2$ by a new value $\tilde{\sigma}_{i,j}^2$ using the expression:

$$\tilde{\sigma}_{i,j}^2 = \sigma_{i,j}^2 + (t - t_{i,j})\tau^2$$

Where $t_{i,j}$ is the time stamp for the weight associated to the j-th value taken by the i-th feature. In this example, the mean of the weight is not updated.

And where $\tau^2$ is a dynamics parameter that specifies how much variance to add to a feature depending on its age, where age is defined as the time elapsed since the weight was last updated. The value of $\tau^2$ is selected depending on the application domain concerned. If the value of $\tau^2$ is too high then the event prediction system over tracks the data and gives poor performance. If the value of $\tau^2$ is too low then the event prediction system fails to adapt appropriately over time. The appropriate value for this parameter may be determined empirically.

In the particular application domain of internet advertising the value of $\tau^2$ may be set at about 1 e-7. Paid search data is inherently non-stationary. Many things can change over time, including a user's behavior, the quality of an advertiser's campaigns, or the prevailing user intention behind common search queries. Dynamics is a way of ensuring that the learned training engine parameters can adjust when the world changes.

Dynamics is implemented by using the time stamp for every feature value. Whenever a feature value is used during training, its age in hours compared to the time of the training example is computed, and, for example, a fixed amount of variance is added per hour of age. This amount of variance added per hour may be the $\tau^2$ parameter in the update equations above.

For example, a value of 1 e-7 is the suggested setting for $\tau^2$ in cases where the event data is about advertisement impressions. This setting was determined by finding a time when the model was tracking empirical click through rate without any delay (after about 5 weeks of training), and choosing a value of $\tau^2$ that allows the total uncertainty of the model to remain at that value.

As mentioned above, another example dynamics process is referred to here as a "revert to the prior" method. An example of this is now described with reference to FIG. 9. In this type of dynamics process both the mean and the variance of the belief distribution over a weight are modified. A prior probability distribution associated with belief about the value of a weight is available at the event prediction system and statistics describing this such as a mean and variance are accessed. Thus in FIG. 9 the event prediction system obtains 900 the weight's prior statistics $\mu_0$ and $\sigma_0^2$. The system also accesses 902 the weight's current statistics $\mu_1$ and $\sigma_1^2$ as well as its time stamp t1 which indicates when the weight's statistics were last updated. A decay parameter $\lambda$ is accessed 904. For example, this may be a user configurable parameter or may be pre-set at the training engine. The system calculates 906 noise-corrected statistics for the weight using the decay parameter and the other accessed statistics mentioned above. In this way both the mean and variance are adjusted.

In the case that the schedule for applying the dynamics process is integral with the training process, then the noise corrected statistics are updated 908 using Bayesian update rules based on the event concerned as described above with reference to step 604 of FIG. 6. The updated statistics are stored 910 and the time stamp updated. In the case that the schedule for applying the dynamics process is independent of the training process then the dynamics process ends at box 906 for the particular weight concerned.

The "revert to the prior" method can be thought of as modifying both the mean and the variance of the weight such that they move towards the prior values $\mu_0$ and $\sigma_0^2$ by an amount that depends on elapsed time. Parameters that control the "revert to the prior" dynamics process comprise $\lambda$ (see below) or a half life parameter (time after which the posterior variance is half-way back to the prior variance).

In order to calculate the noise corrected statistics $\tilde{\mu}_1$ and $\tilde{\sigma}_1^2$ for the weight at step 906 the following equations may be used:

$$\tilde{\sigma}_1^2 = \frac{\sigma_0^2 \sigma_1^2}{(1-\in)\sigma_0^2 + \in \sigma_1^2}$$

and mean $$\tilde{\mu}_1 = \tilde{\sigma}_1^2 \left( (1-\in)\frac{\mu_1}{\sigma_1^2} + \in \frac{\mu_0}{\sigma_0^2} \right)$$

$$\in := 1 - e^{-\lambda(t-t_2)}$$

The decay parameter $\lambda$ has units of inverse time and may be set to any suitable value depending on the application domain concerned. It may be set on a system-wide basis or may be set individually for each feature.

As mentioned above, different schedules for applying a dynamics process to an event prediction system may be used. In the case that the dynamics process is integral with training the ability to adapt to dynamically changing data is given in a particularly simple and effective manner since for a given event only the weights for the features (for example, 19 features) of that event are considered even though there may be tens or even hundreds of millions of weights involved. Also, by using the time stamps, the system is able to make an appropriate amount of update depending on the time elapsed since the last update (which may be 20 hours for example), as opposed to making repeated updates for every feature weight every hour for example.

Yet other approaches to coping with dynamically changing event data involve creating a plurality of training engines which are staggered in time (time at which training began) and enabling the event prediction system to switch between these different training engines as the event data dynamically changes. The embodiments of the present invention improve on this drastically since only one training engine is required.

Figure 10:
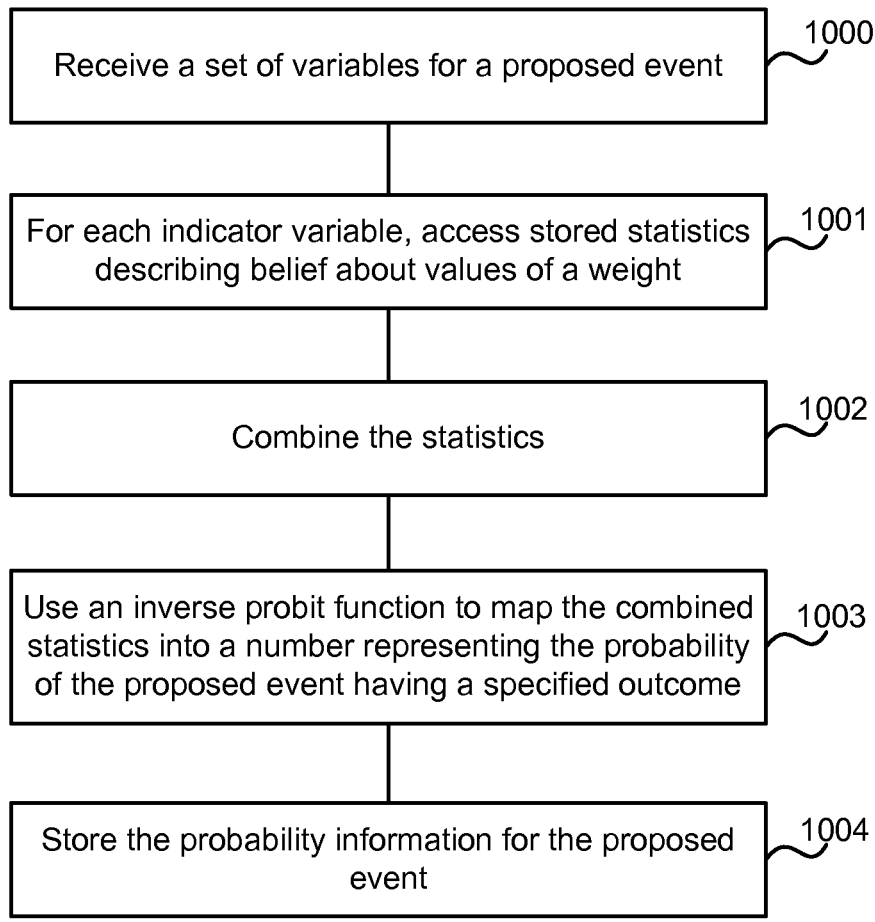
FIG. 10 is a flow diagram of predicting an event.

Given a proposed event it is possible to predict an outcome for that event as now described with reference to FIG. 10. The prediction engine receives a set of variables for the proposed event (block 1000). The prediction engine accesses, for each variable, stored statistics describing belief about values of a weight (block 1001). For example, this information is accessed from a data store such as any of those data stores shown in FIGS. 2 to 5. The stored statistics have been formed during the training process or, if unavailable, are initialized to default values. The statistics of the weights are combined for example and not exclusively in a way that may be consistent with a linear combination of the weights (block 1002) and are then mapped to a number representing the probability that the proposed event will have a specified outcome (block 1003). The mapping process may comprise using any suitable function. A non-exhaustive list of examples is: inverse probit function, logit function or other link function. An inverse probit function and a logit function are examples of link functions.

The probability information for the proposed event is then stored (block 1004). The probability information may then be used in any suitable manner to control a system. The method of FIG. 10 may also be used with indicator variables in place of the general variables taking real values.

For example, in the case of an internet advertising system, probability information for a proposed advertisement being clicked is accessed (FIG. 11, block 1100) bids are received from advertisers (block 1101) and a price for the advertisement (should it be clicked) is calculated on the basis of the bids and the probability information (block 1102) and possibly other information. The price is then stored and the advertiser billed as appropriate (block 1103).

Figure 11:
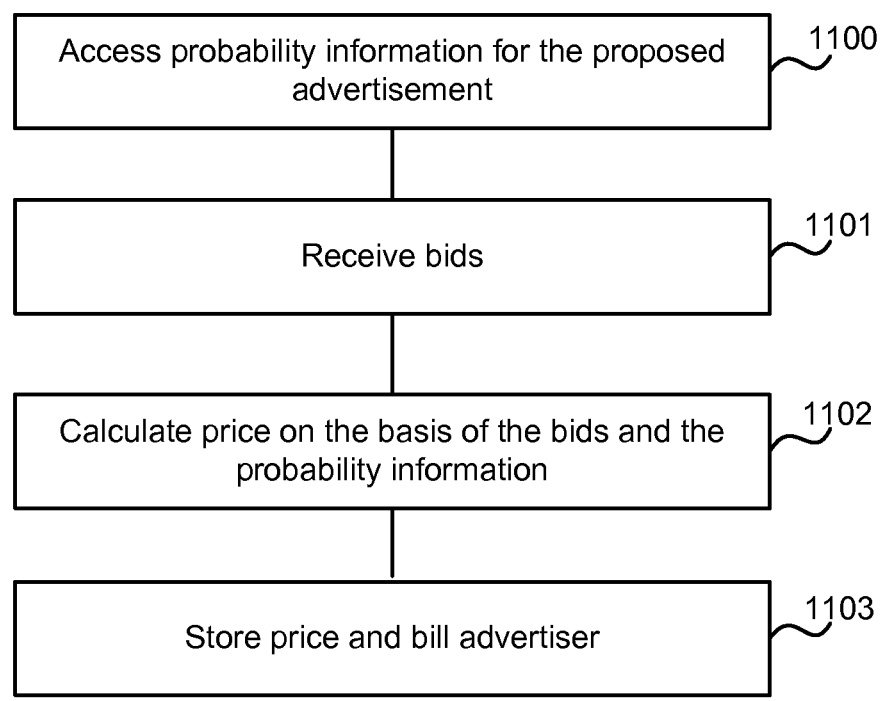
FIG. 11 is a flow diagram of billing an internet advertiser.

In another example, the probability information may relate to an internet advertisement being clicked and that click resulting in a sale or other successful outcome for the advertiser. This is referred to as a successful conversion of the internet advertisement into a sale or other successful outcome for the advertiser. In this case the process of FIG. 11 is similar and the price is calculated on the basis of the bids and the probability of successful conversion.

Figure 12:
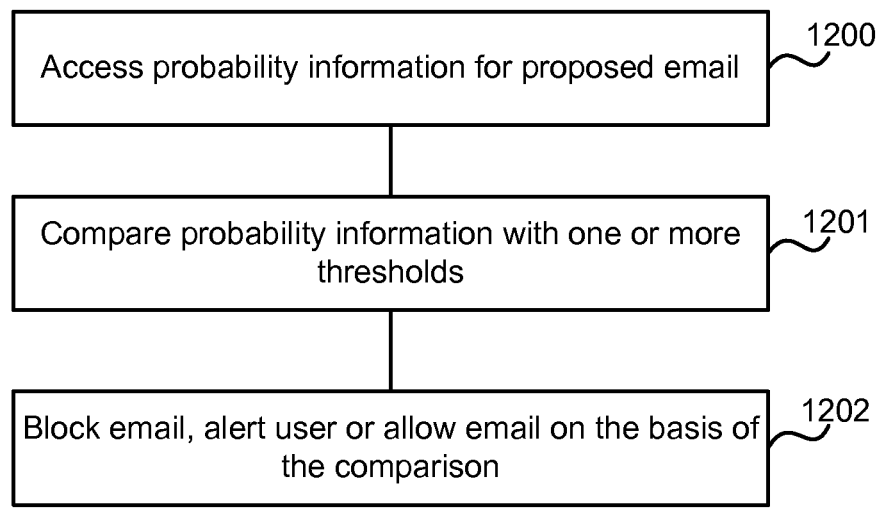
FIG. 12 is a flow diagram of email filtering.

In another example (see FIG. 12) the probability information relates to whether a proposed email is spam or not. The probability information is accessed (block 1200) by the anti-spam system and compared with one or more specified thresholds (block 1201). The anti-spam system then blocks the email, alerts a user or allows the email on the basis of the comparison (block 1202).

Figure 13:
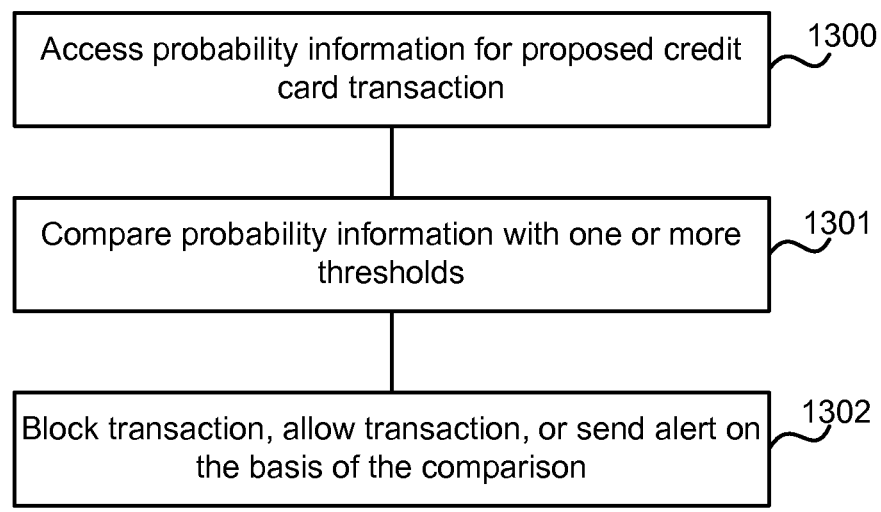
FIG. 13 is a flow diagram of credit card fraud detection.

In another example (see FIG. 13) the probability information relates to whether a credit card transaction is fraudulent or not. The probability information is accessed (block 1300) and compared with one or more specified thresholds (block 1301). The anti-fraud system then blocks the transaction, allows the transaction and/or triggers alerts on the basis of this comparison (block 1302).

As mentioned above the methods described herein comprise modeling belief about weights for variables describing factors relating to an event. Any suitable model may be used. For example, a probability distribution is used to model the belief. A bell-curve belief distribution such as a Gaussian distribution may be used, or any other suitable probability distribution. For example, a bimodal or skewed distribution.

Statistics describing the distribution are used in the models as mentioned above. For example, in the case that a Gaussian distribution is used, its mean $\mu$ and variance $\sigma^2$ may be selected.

In the case that a Gaussian distribution is used, for example, to model belief about a value of a weight, the area under the distribution curve within a certain range corresponds to the belief that the weight value will lie in that range. As the prediction system learns more about a weight the variance of the distribution tends to become smaller, more tightly bracketing the system's belief about the value of that weight.

As mentioned above, the update mechanism may use techniques based on Bayes' law. In the case of an event comprising presentation of an advertisement which is clicked, then example update rule is as follows:

$$\mu_i' \leftarrow \mu_i + \frac{\sigma_i^2 x_i^2}{C} \cdot v\left(\frac{\sum_{i=1}^{N} \mu_i x_i}{C}\right)$$

$$\sigma_i^{2'} \leftarrow \sigma_i^2 \left[ 1 - \frac{\sigma_i^2 x_i^2}{C^2} \cdot w\left(\frac{\sum_{i=1}^{N} \mu_i x_i}{C}\right) \right]$$

In the case of an event comprising presentation of an advertisement which is not clicked, then an example update rule is as follows:

$$\mu_i' \leftarrow \mu_i - \frac{\sigma_i^2 x_i^2}{C} \cdot v\left(\frac{-\sum_{i=1}^{N} \mu_i x_i}{C}\right)$$

$$\sigma_i^{2\prime} \leftarrow \sigma_i^2 \left[1 - \frac{\sigma_i^2 x_i^2}{C} \cdot w\left(\frac{-\sum_{i=1}^{N} \mu_i x_i}{C}\right)\right]$$

In these equations C is given by:

$$C = \sum_{i=1}^{N} \sigma_i^2 x_i^2 + \beta^2$$

In some embodiments the value of x in the above update equations is either 0 or 1 depending on whether an indicator variable is "on" or not as mentioned above. That is, in some embodiments, indicator variables are grouped into N groups with one group per feature. For example, an example feature may be the age of an end user (advertisement viewer, email receiver, credit card transaction party etc.). In this case a plurality of indicator variables for the feature may be age ranges, for example, 0 to 9, 10 to 19, 20 to 29, 30 to 39 etc. However, for a given event only one of the age ranges may be on. That is, an end user's age is only present in one of the bins. In this case 0 and 1 may be used to represent whether an indicator variable is on or not. By using groups of indicator variables in this way it is possible to reduce processing and memory requirements, which is especially important in many applications where the quantities of data to be analyzed are huge. However, it is not essential to use groups of indicator variables where only one indicator variable may be on in any one group. In this case x in the above equations may have values other than 0 or 1.

In these equations, the only unknown is $\beta^2$ which is the variance of the feedback around the weight of each variable. $\beta^2$ is thus a configurable parameter and for example is set to 1. The functions v and w are given by:

$$v(t)=N(t)/F(t)$$

$$w(t)=v(t)*(v(t)-t)$$

Where the symbols N and F represent the density of the Gaussian distribution function and the cumulative distribution function of the Gaussian, respectively. The symbol t is simply an argument to the functions. Any suitable numerical or analytic methods can be used to evaluate these functions such as those described in Press et al., Numerical Recipes in C: the Art of Scientific Computing ($2^{nd}$. Ed.), Cambridge, Cambridge University Press, ISBN-00521-43108-5.

These update equations can be thought of as Bayesian update equations. They receive a set of variables (which may be either indicator variables or general variables taking real values) describing an observed event together with event outcome information. The equations update the values of the mean and variance for each weight in light of the data, assuming that the posterior distribution over the weights is again Gaussian. With a single pass over the training data this procedure is referred to as Gaussian density filtering and more generally as assumed density filtering (ADF). It is also possible to use expectation propagation (EP) whereby ADF is iterated to convergence. Use of Expectation Propagation is described in detail in "A family of algorithms for approximate Bayesian inference" 2001, Thomas Minka, MIT PhD thesis. This may give a more exact solution but requires more computational resources.

The statistics (mean and variance) may be stored in any suitable manner. For example, using vectors. Learning the distribution for observed data over such a vector of statistics for the weights is a computationally difficult task and the assumed density filtering technique enables a solution to be obtained.

Given a value of the mean and variance for each weight, the predicted probability of outcome A for a given event is given by:

$$p(A \mid \text{event}) = \Phi\left(\frac{\sum_i x_i \mu_i}{\sqrt{\beta^2 + \sum_j x_j^2 \sigma_j^2}}\right).$$

The sums are over all the features weighted by feature values for the given event. The function $\Phi(x)$ is the cumulative normal distribution function which is also known as the inverse probit function. However, it is also possible to use other mapping functions $\Phi(x)$ here such as a logit function or other link function.

For example, given a known set of weights a prediction for a particular proposed event may be made by adding the weights of all the variables for the event. The resulting sum is a real number. An inverse probit function may be used to map this number to a probability between 0.0 and 1.0.

Since many of the features used in the prediction process may take very many values (variables) the methods described herein are arranged to keep track of only those weights which actually affect the prediction. As mentioned above, weights are initialized to a common prior and pruning is carried out at intervals to eliminate those weight parameters that have remained close to the prior. This is now described in more detail with reference to FIG. 14.

Figure 14:
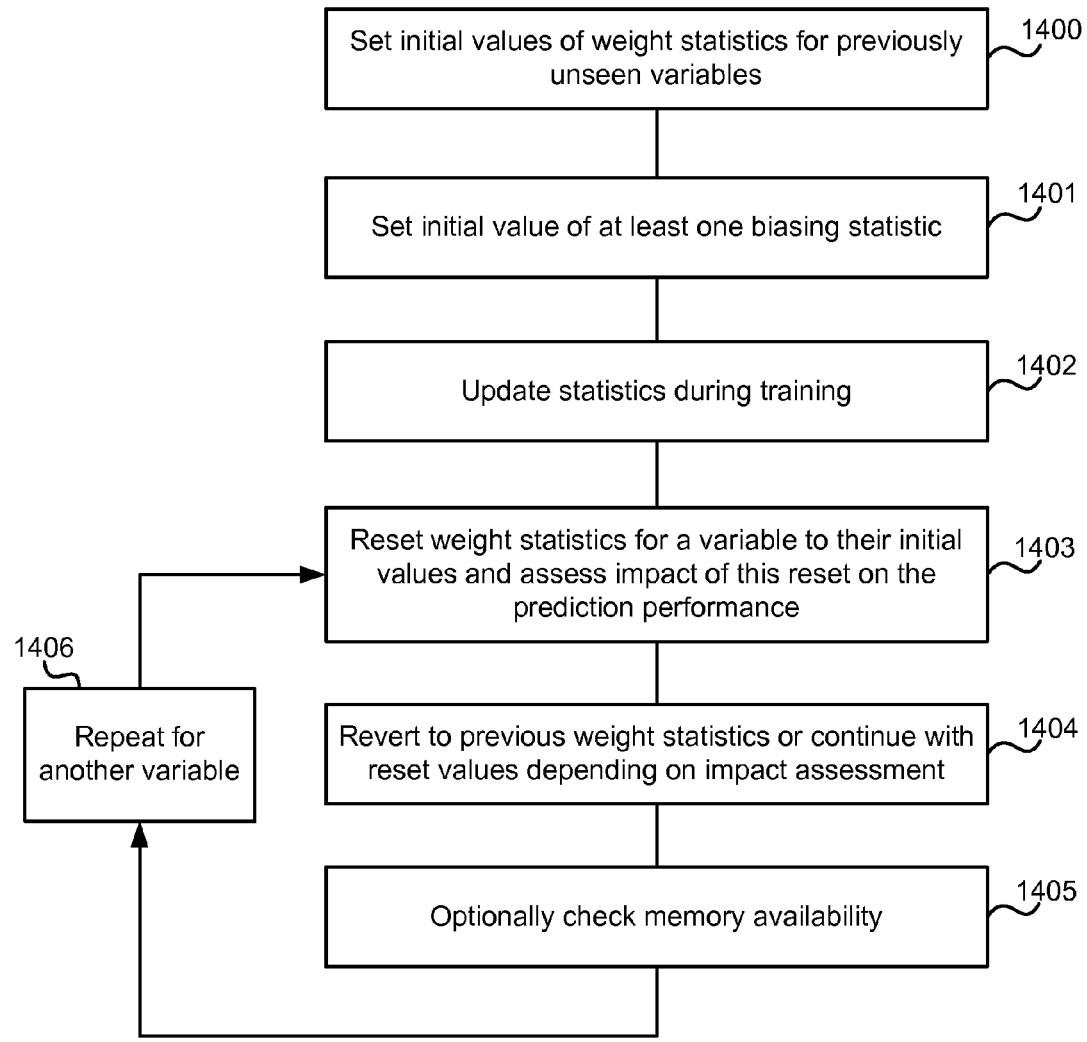
FIG. 14 is a flow diagram of part of a method of training an event prediction system.

FIG. 14 is a block diagram of an example method of setting initial values for weight statistics and also of pruning. This method may be carried out as part of the training process of FIG. 6 for example.

During the training process, if the training engine is presented with variables for an event where it has not previously seen those variables, it sets initial values of weight statistics for those unseen variables (block 1400). These initial values may be referred to as the prior. In some examples, the means are all initialized to 0.0 except for a "dummy" mean $\mu_0$ which is set to a specified value in order to provide a bias (block 1401). For example, this dummy or biasing mean is set such that the a-priori prediction probability is a specified value such as 0.02=2% or any other suitable value. In the case of internet "paid search" advertising, where one might assume that around 2% of all displayed adverts are clicked, the a-priori prediction probability is appropriately 2%. However, this biasing mean and an associated biasing variance may be set at other values depending on the particular application, and can be learnt from a separate set of training data. When a previously unseen variable is introduced, this may inappropriately influence the prediction results. The biasing mean may be used to prevent or reduce the effects of this. The following equation may be used to determine an appropriate initial value for the biasing mean.

$$\Phi^{-1}(p(A \mid \text{event})) * \sqrt{\sum_{i=1}^{N} x_i^2 \sigma_i^2 + \beta^2} = \mu_{bias}$$

In some examples, where indicator variables are used, the biasing mean and variance may be associated with an indicator variable which is always on and which may be referred to as a bias indicator variable. As mentioned above, the biasing mean and variance may be learnt. Since all observations help in this learning process it is relatively fast.

The variance values for previously unseen variables are distributed equally so that for example $\Sigma_i \sigma_i^2 = 1.0$. Other values for the sum of the variances can be chosen by appropriately tuning on a separate set of data during training time. For example, different values of $\sigma_i^2$ may lead to a slightly different learning behavior. Larger variances tend to result in faster adaptation and smaller variances in more conservative updates. The variances may be chosen differently for different variables.

The training engine proceeds to update the statistics during the training process (block 1402) as described above. If the pruning process is entered, then, for a given variable, the weight statistics are reset to their initial values (re-initialized) and an assessment is made about the impact of this reset on the prediction performance (block 1403). For example, in some embodiments this is achieved by computing a difference $\Delta_i$ as follows:

$$\Delta_i = \left| \Phi\left( \frac{\mu_{bias} + \mu_i}{\sqrt{\sigma_{bias}^2 + \sigma_i^2 + \beta^2}} \right) - \Phi\left( \frac{\mu_{bias} + O}{\sqrt{\sigma_{bias}^2 + \sigma_o^2 + \beta^2}} \right) \right|$$

If this difference is less than a specified value such as 0.01% then the weight statistics for this variable are discarded (re-initialized).

In another embodiment a Kullback-Leibler divergence may be used to make this assessment. In this case the following equation is used where p is the first term in the difference calculation above and q is the second term in the difference calculation above.

$$KL(p, q) = p \log\left(\frac{q}{p}\right) + (1-p) \log\left(\frac{1-q}{1-p}\right)$$

The pruning process then reverts to the previous weight statistics or continues with the reset values depending on the impact assessment (block 1404). An optional check for memory availability is made (1405) for example, if the pruning process is carried out only until memory availability is sufficient to continue the training process. The pruning process then repeats for another variable (block 1406).

The methods described above with reference to FIG. 14 may also be used with indicator variables in place of the general variables taking real values.

By using the time stamps and adding noise based on the amount of time elapsed the training engine is able to adapt to dynamically changing event data. This ability to deal with dynamics may also have a beneficial effect by increasing the pruning rate in some embodiments. For example, where pruning comprises removing weights from the system if their removal does not substantially affect the event predictions. Pruning helps reduce the number of weights in the system with little or no accuracy loss. Adding noise to a weight reduces its impact on the predicted events. In this way use of time stamps and adding noise is able to increase the pruning rate and increase memory and computational efficiency.

As mentioned above, a plurality of specified features are used during the training and prediction process. The particular features chosen depend on the particular application concerned whether it be internet advertising, credit card fraud detection or other applications. In addition, the features may be selected by making offline analysis of the training data in order to select those features which are most effective for use in the prediction process.

In some embodiments the event prediction system is used in the field of internet advertising. For example, it may be used to predict not only whether a displayed advertisement will be clicked or not, but also whether any click is likely to result in a successful conversion for the advertiser. In this case the probability that a conversion will occur given a proposed event X may be given as follows:

$$\begin{aligned}
P(\text{conversion} = \text{True} \mid X) &= P(\text{conversion} = \text{True} \mid \text{click} = \text{True}, X) \\
&\quad P(\text{click} = \text{True} \mid X) + \\
&\quad P(\text{conversion} = \text{True} \mid \text{click} = \text{False}, X) \\
&\quad P(\text{click} = \text{False} \mid X) \\
&= P(\text{conversion} = \text{True} \mid \text{click} = \text{True}, X) \\
&\quad P(\text{click} = \text{True} \mid X)
\end{aligned}$$

In the above, line 2 follows from line 1 since P(conversion=True|click=False,X)=0, i.e., there can only be a conversion if there was a click.

In this case the methods described herein may be used to predict the probability that a click will occur P(click=T|X) for a proposed advertisement. The methods described herein may also be used to predict the probability that a conversion will occur given a click. In this case training data comprising information about clicks that have resulted in successful conversions is required. In this way the probability of a successful conversion may be predicted.

Figure 15:
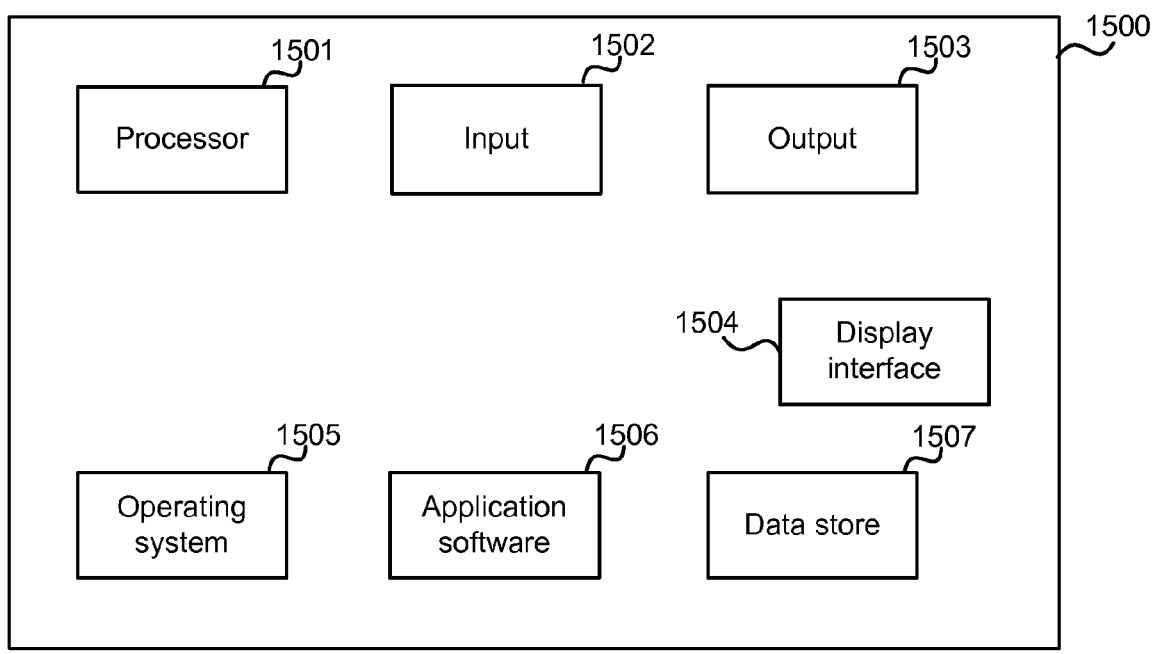
FIG. 15 illustrates an exemplary computing-based device in which embodiments of an event prediction system may be implemented.

FIG. 15 illustrates various components of an exemplary computing-based device 1500 which may be implemented as any form of a computing and/or electronic device, and in which embodiments of an event prediction system may be implemented.

The computing-based device 1500 comprises one or more inputs 1502 which are of any suitable type for receiving media content, Internet Protocol (IP) input, information about email, information about internet advertisements, information about credit card transactions, information about events whose outcomes are to be predicted etc. Also provided is an output 1503 for providing output comprising at least prediction results to another system for controlling that system.

Computing-based device 1500 also comprises one or more processors 1501 which may be microprocessors, controllers or any other suitable type of processors for processing computing executable instructions to control the operation of the device in order to predict outcomes of events. Platform software comprising an operating system 1505 or any other suitable platform software may be provided at the computing-based device to enable application software 1506 to be executed on the device.

The computer executable instructions may be provided using any computer-readable media, such as memory 1507. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

A display interface 1504 may be provided such as an audio and/or video output to a display system integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method at an event prediction system comprising the steps of:
    accessing a memory storing, for each of a plurality of events: a time stamp and statistics, the statistics describing probability distributions associated with weights of variables describing the event;
    arranging a processor to predict events using the stored statistics;
    applying a dynamics process to a plurality of the statistics according to a schedule;
    wherein:
        the dynamics process comprises modifying statistics associated with a weight in a manner dependent on the time stamp of that weight so that the uncertainty about the associated variable's influence on prediction of future events is increased;
        the memory stores the statistics for each weight in the form of a mean and a variance describing a probability distribution; and
        the dynamics process comprises modifying the variance.

2. A method as claimed in claim 1 wherein the dynamics process comprises modifying both the mean and variance.

3. A method as claimed in claim 1 wherein the schedule is integral with a training schedule used to train the event prediction system.

4. A method as claimed in claim 1 wherein the schedule is independent of a training schedule used to train the event prediction system.

5. A method as claimed in claim 1 wherein the dynamics process comprises replacing a current value of a weight variance $\sigma_{i,j}^2$ by a new value $\tilde{\sigma}_{i,j}^2$ using the expression:

$$\tilde{\sigma}_{i,j}^2 = \sigma_{i,j}^2 + (t - t_{i,j})\tau^2$$

where $t_{i,j}$ is the time stamp for the weight associated to a j-th value taken by an i-th feature; t is the current time; and $\tau^2$ is a configurable dynamics parameter.

6. A method as claimed in claim 1 wherein the dynamics process comprises calculating noise corrected statistics $\tilde{\mu}_1$ and $\tilde{\sigma}_1^2$ for a weight using the following equations:

$$\tilde{\sigma}_1^2 = \frac{\sigma_0^2 \sigma_1^2}{(1-\epsilon)\sigma_0^2 + \epsilon\,\sigma_1^2}$$

$$\tilde{\mu}_1 = \tilde{\sigma}_1^2\left((1-\epsilon)\frac{\mu_1}{\sigma_1^2} + \epsilon\frac{\mu_0}{\sigma_0^2}\right)$$

$$\epsilon := 1 - e^{-\lambda(t-t_2)}$$

where $\lambda$ lambda is a configurable decay parameter, $\mu_0$ and $\sigma_0^2$ are the weight's prior statistics, $\mu_1$ and $\sigma_1^2$ are its current statistics, $t_2$ is the weight's time stamp and t is the current time.

7. A method as claimed in claim 1 wherein the processor is used to select a plurality of the time stamps using a threshold time stamp and to replace the statistics associated with the selected time stamps by default values.

8. A method as claimed in claim 1 which comprises storing the time stamps at the memory using a data structure based on modulo arithmetic.

9. A method as claimed in claim 1 which comprises storing the variables at the memory using a sparse binary vector data structure.

10. A method as claimed in claim 1 which further comprises using the processor to predict events and to use the predicted events to control a system selected from any of: an internet advertising system, a credit card fraud detection system, an email filtering system, a credit scoring system, a search engine, a binary classification system and an information filtering system.

11. A method as claimed in claim 1 wherein the processor receives the plurality of statistics from a data store.

12. A method as claimed in claim 1 wherein the plurality of statistics are formed during a training process.

13. An online advertisement system comprising:
  a memory storing, for each of a plurality of advertisement impressions: a time stamp and statistics, the statistics describing probability distributions associated with weights of variables describing the advertisement impression;
  a processor arranged to predict outcomes of advertisement impressions using the stored statistics;
  the processor being arranged to apply a dynamics process to a plurality of the statistics according to a schedule;
  wherein:
    the dynamics process comprises modifying statistics associated with a weight in a manner dependent on the time stamp of that weight so that the uncertainty about the associated variable's influence on prediction of outcomes of future advertisement impressions is increased;
    the memory stores the statistics for each weight in the form of a mean and a variance describing a probability distribution; and
    the dynamics process comprises modifying both the mean and variance.

14. An online advertisement system as claimed in claim 13 wherein the processor is arranged to implement the schedule for the dynamics process integral with a training schedule used to train the event prediction system.

15. An online advertisement system as claimed in claim 13 wherein the processor is arranged to implement the schedule for the dynamics process independently of a training schedule used to train the event prediction system.

16. An online advertisement system as claimed in claim 13 wherein the processor is further arranged to apply the dynamics process to the plurality of the statistics according to the schedule at substantially a same time that the plurality of the statistics undergoes training updates.

17. A method at an online advertisement system comprising the steps of:
  accessing a memory storing, for each of a plurality of advertisement impressions: a time stamp and statistics, the statistics describing probability distributions associated with weights of variables describing the advertisement impression;
  arranging a processor to predict outcomes of advertisement impressions using the stored statistics;
  observing the outcome of a particular advertisement impression;
  applying a dynamics process to the statistics associated with the particular advertisement impression and simultaneously updating those statistics in the light of the observed outcome according to Bayesian update process;
  wherein the dynamics process comprises modifying statistics associated with a weight in a manner dependent on the time stamp of that weight so that the uncertainty about the associated variable's influence on prediction of future events is increased and the dynamics process comprises replacing a current value of a weight variance by a new value of the weight variance using the expression, the new value of the weight variance being equal to the current value of the weight variance plus a product of a configurable dynamics parameter and a change in time between a time stamp for a current time and a time stamp associated to the new value of the weight variance.

18. A method as claimed in claim 17 wherein the dynamics process comprises calculating noise corrected statistics $\tilde{\mu}_1$ and $\tilde{\sigma}_1^2$ for a weight using the following equations:

$$\tilde{\sigma}_1^2 = \frac{\sigma_0^2 \sigma_1^2}{(1-\epsilon)\sigma_0^2 + \epsilon \sigma_1^2}$$

$$\tilde{\mu}_1 = \tilde{\sigma}_1^2 \left( (1-\epsilon)\frac{\mu_1}{\sigma_1^2} + \epsilon \frac{\mu_0}{\sigma_0^2} \right)$$

$$\epsilon := 1 - e^{-\lambda(t-t_2)}$$

where λ lambda is a configurable decay parameter, $\mu_0$ and $\sigma_0^2$ are the weight's prior statistics, $\mu_1$ and $\sigma_1^2$ are its current statistics, $t_2$ is the weight's time stamp and t is the current time.

19. A method as claimed in claim 17 wherein the configurable dynamics parameter is set to about 1 e-7.

20. A method as claimed in claim 17 wherein the configurable dynamics parameter is determined based at least in part on a click through rate.

* * * * *